US006307483B1

(12) United States Patent
Westfield et al.

(10) Patent No.: US 6,307,483 B1
(45) Date of Patent: *Oct. 23, 2001

(54) CONVERSION CIRCUIT FOR PROCESS CONTROL SYSTEM

(75) Inventors: Brian L. Westfield, Victoria; Stephen D. Anderson, Edina; Bennett L. Louwagie, Eden Prairie; Todd A. Piechowski, Buffalo; Gregory C. Brown, Minnetonka, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,775

(22) Filed: Apr. 7, 1999

Related U.S. Application Data

(60) Division of application No. 08/897,523, filed on Jul. 21, 1997, now Pat. No. 5,963,147, and a continuation-in-part of application No. 08/479,801, filed on Jun. 7, 1995, now Pat. No. 5,650,777.

(51) Int. Cl.⁷ .................................................. G08C 19/04

(52) U.S. Cl. ................................ 340/870.11; 340/870.16; 340/310.06

(58) Field of Search ....................... 340/870.11, 870.16, 340/870.15, 310.06, 310.01

(56) References Cited

U.S. PATENT DOCUMENTS

| 3,764,983 | 10/1973 | Stok | 340/150 |
| 3,872,389 | 3/1975 | Willard | 328/137 |
| 4,206,443 | 6/1980 | Britton | 340/147 |

(List continued on next page.)

FOREIGN PATENT DOCUMENTS

| 40 21 258 A1 | 1/1991 | (DE) . |
| 42 27 577 C1 | 2/1994 | (DE) . |
| 0 490 864 A1 | 6/1992 | (EP) . |
| 0 589 849 A1 | 3/1994 | (EP) . |
| 0 591 926 A2 | 4/1994 | (EP) . |

OTHER PUBLICATIONS

"Remote Terminal Units for Distributing Control and Data Acquisition", Arcom Control Systems, 1995, (brochure). No Page Nu.
"Field Bus Interface Products for Distributed Control and Data Acquisition", Arcom Control Systems, 1995 (brochure). No Page Nu.
"Communications Gateway Products for Distributed Control and Data Acquisition", Arcom Control Systems, 1995 (brochure). No Page Nu.
"Developing Process Systems Using Hart", Arcom Control Systems, 1992, pp. 3–22.

(List continued on next page.)

Primary Examiner—Timothy Edward, Jr.
(74) Attorney, Agent, or Firm—Westman, Champlin & Kelly, P.A.

(57) ABSTRACT

Conversion circuitry for use in a process control system is adapted for coupling to a primary process control loop. Digital receiver circuitry in the conversion circuitry receives a digital signal transmitted over the primary process control loop from a field transmitter and responsively provides a digital output. A microprocessor receives the digital output and responsively provides a secondary loop control output. Secondary loop control circuitry for coupling to a secondary process control loop receives the secondary loop control output from the microprocessor and responsively controls current flowing through the secondary process control loop. The current flowing through the secondary process control loop is related to the digital signal transmitted by the field transmitter.

17 Claims, 7 Drawing Sheets

U.S. PATENT DOCUMENTS

| | | | |
|---|---|---|---|
| 4,356,475 | 10/1982 | Neumann et al. | 340/521 |
| 4,484,190 | 11/1984 | Bedard | 340/825.57 |
| 4,739,183 | 4/1988 | Tokura et al. | 307/9 |
| 4,816,825 | 3/1989 | Chan et al. | 340/528.5 |
| 4,818,994 | 4/1989 | Orth et al. | 340/870.21 |
| 4,994,788 | 2/1991 | Philippe et al. | 340/505 |
| 5,008,662 | 4/1991 | Tokizane et al. | 340/825.06 |
| 5,223,826 | 6/1993 | Amou et al. | 340/825.06 |
| 5,963,147 * | 10/1999 | Westfield et al. | 340/870.11 |

OTHER PUBLICATIONS

"Digital Data Communication, Control and Maintenance," by W. Van Der Bijl, *Journal A*, vol. 34, No. 1, 1993, pp. 19–23.

"SMV 3000 Smart Multivariable Transmitter; The Four–In–One Transmitter and Flow Computer," Honeywell Inc., 11/95 (brochure). No Page Nu.

"Multivariable Analog Interface for Smart Transmitters," by S. Oxenberg et al., Symposium '96, pp. 1–7.

"Fieldbus In TotalPlant Solutions," by P. Griem et al., Symposium '96, pp. 1–7.

SMV 3000 Multivariable Pressure Transmitter: Release 150 Enhancements, by R. Harvey et al., pp. 1–7.

Materials from www.honeywell.com Internet Site dated Sep. 16, 1996. No Page Nu.

"Multivariable Trip Switch For Smart Transmitters," Vektron Corporation, Jan. 9, 1997, (Brochure). No Page Nu.

Innovation Awards, *FC*, Feb. 1997. p. 26.

SMV 3000 Smart Multivariable Transmitter, Honeywell, 1995, pp. 1–11.

"Use of Smart Multivariable Transmitters for Combustion Air Flow Measurement," by M. Cushing, *ISA*, 1996, pp. 221–229.

Exhibit and Product Guide to ISA 96, *I&CS*, Sep. 1996. p. 80.

"The New SMV 3000 Solves the Mystery of Flow," Honeywell. No Page Nu.

* cited by examiner

CONVERSION CIRCUIT FOR PROCESS CONTROL SYSTEM

This is a division of U.S. Ser. No. 08/897,523, filed Jul. 21, 1997, which issued as U.S. Pat. No. 5,963,147 and is a Continuation-In-Part application of U.S. Ser. No. 08/479, 801, filed Jun. 7, 1995 and issued as U.S. Pat. No. 5,650,777.

BACKGROUND OF THE INVENTION

The present invention relates to process control systems. More specifically, the invention relates to transmission of process variables from field transmitters to control room circuitry in process control systems.

Generally, process variable field transmitters are used in process control systems to measure process variables such as flow, temperature or pressure and transmit these variables to a control room. This information is used at the control room to monitor and control operation of the process.

Traditionally, transmission of process variables has been through the use of two-wire current loops. A 4 mA signal in a typical 4–20 mA current loop represented a minimum reading and a 20 mA signal represented a maximum reading of the process variable. Power for the current loop and field transmitter was supplied from the control room in order to maintain an intrinsically safe and explosion-proof environment in the field. The field transmitter controlled the current flowing through the loop based upon the measured process variable. This, and other types of current loops, have become industry standards.

With the advent of microprocessors, field transmitters have become increasingly automated. One offshoot of this technology is the use of digital signal transmissions from field transmitters. In one design, a digital signal is superimposed on the 4–20 mA process variable current signal. This digital signal can represent a primary process variable typically also represented by the analog loop circuits or secondary process variables. In another configuration, multiple field transmitters are connected to the same process control loop and each transmitter transmits digital process variables over the loop to the control room. Traditional control room circuitry adapted for the analog communication techniques have not been able to fully utilize the transmitters capable of transmitting digital signals.

SUMMARY OF THE INVENTION

Conversion circuitry is provided for coupling a field transmitter transmitting digital information to control room circuitry adapted for receiving analog signals. The field transmitter transmits digital information on a primary process control loop. The conversion circuitry includes a digital receiver for receiving first and second digital signals from the primary loop and providing a digital output representative of the digital signals. A microprocessor receives the digital output and responsively provides a digital secondary loop control output as a function of the first and second digital signals. Secondary loop control circuitry receives the secondary loop control output and responsively controls an analog signal applied to a secondary control loop.

In one embodiment, multiple digital signals are received from the primary loop and separately provided to multiple secondary loops. In one embodiment, the secondary loop is a 4–20 mA loop. A single field transmitter may be used to transmit multiple process variables. Additionally, multiple field transmitters may be used to transmit multiple digital process variables.

DETAILED DESCRIPTION OF THE PREFERRED EMBODIMENTS

Figure 1:
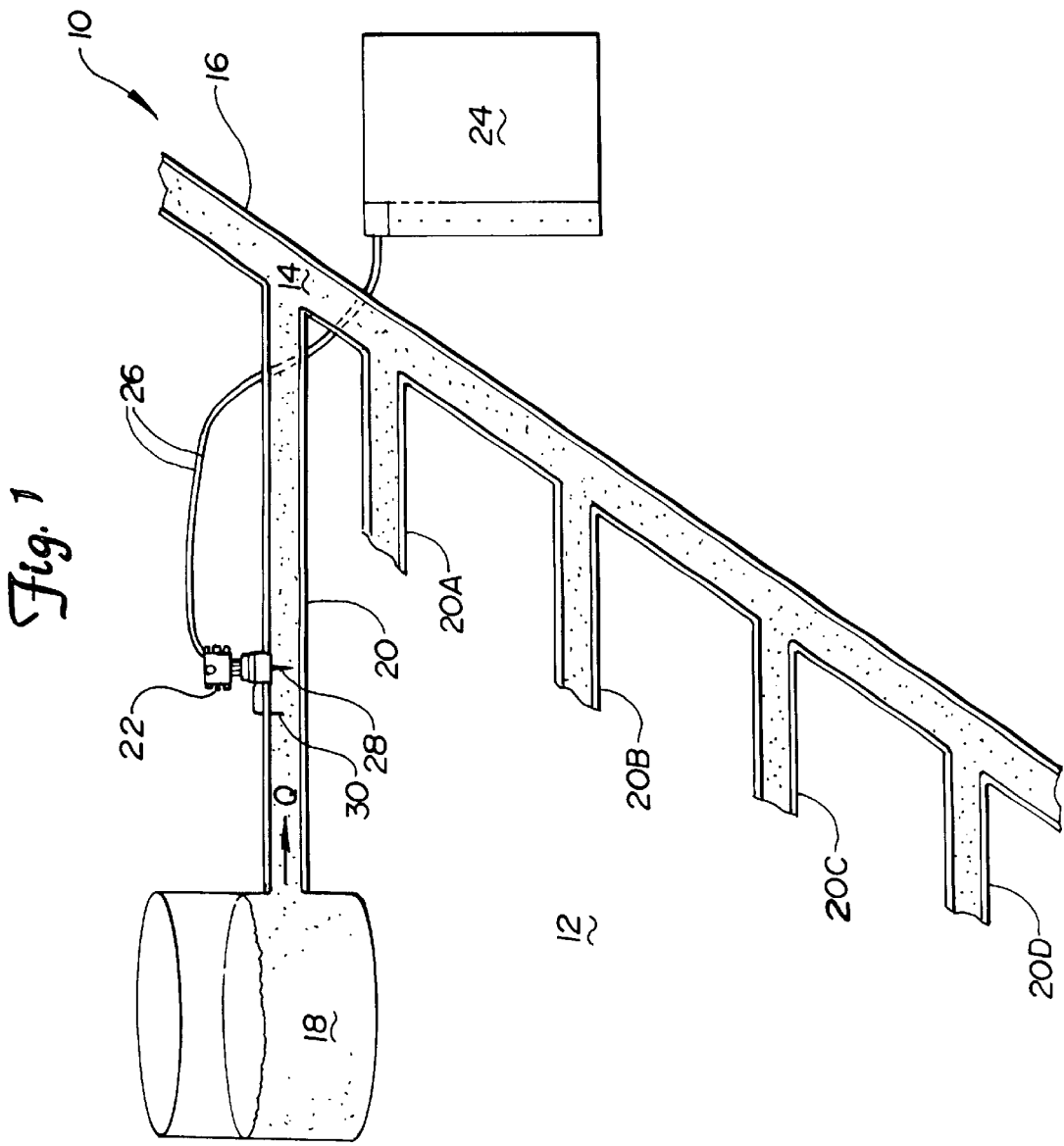
FIG. 1 is a diagram of a portion of a process control system having a field transmitter connected to a control room over a two-wire process control loop.

The invention set forth herein provides an interface circuit which converts digital communication messages (such as those according to the HART® or Fieldbus communication standards) from a multivariable field transmitter into a plurality of 4–20 mA current loops. This technique allows simultaneous monitoring of a plurality of different process variables on separate current loops. In one embodiment, the interface circuit resides in the process control room and will typically be connected across the load resistor in the current loop for the multivariable transmitter FIG. 1 shows an industrial process control application 10 such as in a petrochemical tank farm 12. A fluid 14 flows through a pipe network 16. A storage tank 18 is connected to piping network 14 by pipe 20. Additional pipes, 20A, 20B, 20C and 20D may be used to extend the system to connect to additional storage tanks. A field mounted transmitter 22 is shown coupled to pipe 20. Transmitter 10 typically must operate in an explosive environment and must meet intrinsic safety requirements. Transmitter 22 is connected to a control room 24 through a primary two-wire loop 26 which wholly powers the transmitter. Transmitter 22 includes differential pressure sensing element 28 and temperature sensor 30, and is a multivariable type transmitter in that it can transmit process variables representative of either pressure or temperature.

Control room 24 includes circuitry to monitor process variables sensed by transmitter 22. Although it is not shown explicitly, in a typical process control application the process is controlled in response to the sensed process variables. For example, circuitry in control room 24 may control flow by controlling a remotely located valve (not shown). This provides a closed feedback loop for controlling the process.

Field transmitter 22 is connected to monitor two different process variables, flow and temperature. These process variables are digitally coupled to two-wire loop 26. In typical prior art field analog transmitters, only a single process variable could be coupled to a current loop, since the process variable was represented by an analog current level flowing through the loop as controlled by the field transmitter. However, more recent communication protocols, such as the HART® or Fieldbus communication protocols (whose specifications are hereby incorporated by reference), allow multiple process variables to be coupled to the same process control loop by superimposing a digital representation of a process variable (a "digital process variable") on the analog current flowing through loop 26 representative of a process variable (an "analog process variable"). However, to fully utilize the capabilities of such a system, circuitry in control room 24 must be capable of receiving more than one process variable from the same control loop.

Figure 2:
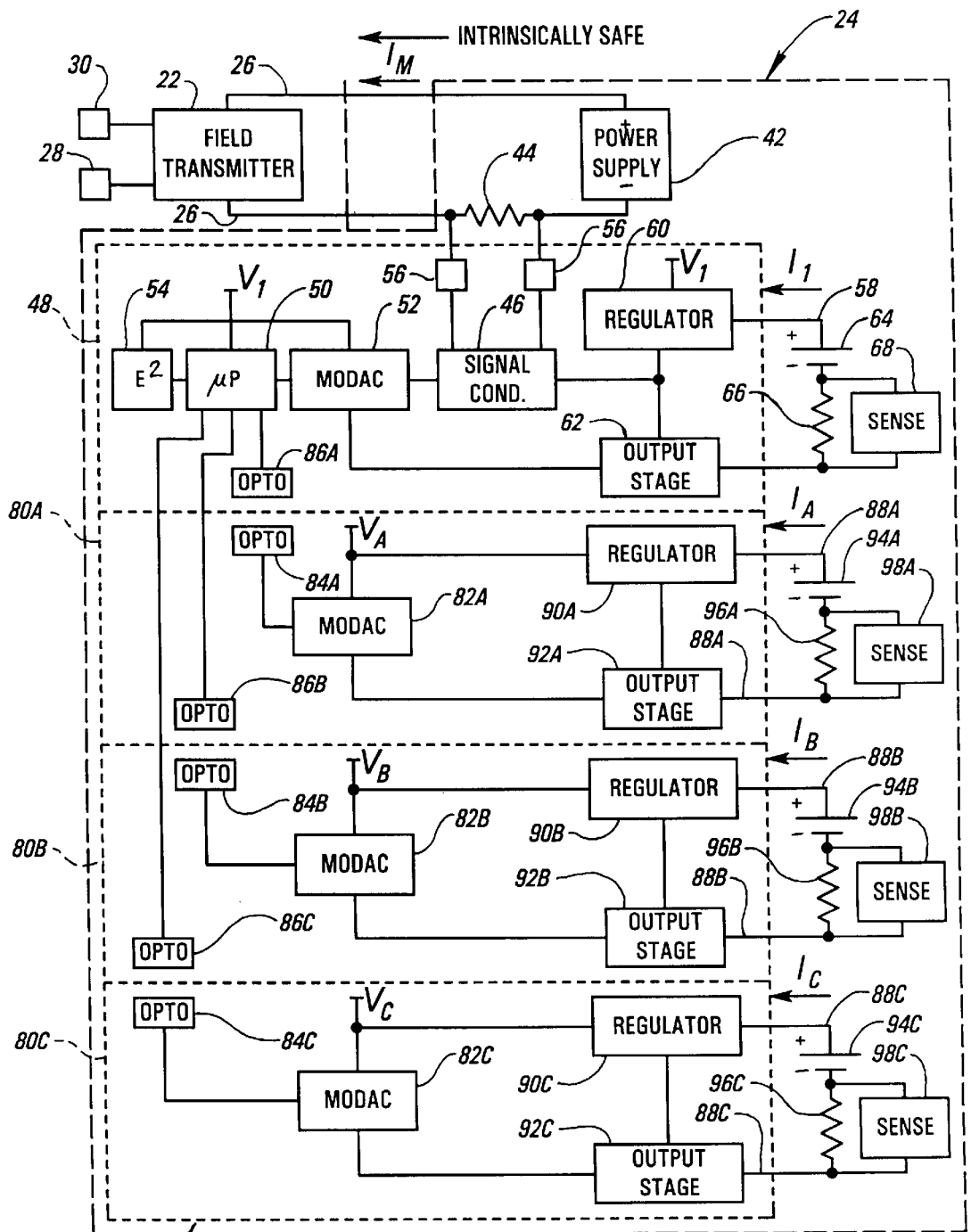
FIG. 2 is a simplified block diagram of conversion circuitry coupled to a primary control loop and a plurality of secondary control loops in accordance with the present invention.

FIG. 2 shows a block diagram of conversion circuitry 40 located in control room 24 in accordance with one embodiment of the present invention. Conversion circuitry 40 provides an interface circuit which converts data from a process control loop which has multiple digital process variables into a number of individual analog process variables on 4–20 mA current loops, where the current in each loop is representative of one of the digital process variables. This allows multiple digitized process variables to be simultaneously monitored on separate 4–20 mA current loops.

Process control room 24 includes power supply 42 connected to process control loop 26. Power supply 42 is used to generate $I_M$ flowing through loop 26. A sense resistor 44 is connected in series with loop 26 and has a voltage thereacross in response to current flowing through loop 26. This voltage varies in response to digital signals carried on loop 26 and provides an input to signal conditioning circuit 46 of primary converter circuit 48. In primary converter circuit 48, microprocessor 50 is connected to MODAC 52 and memory 54, and is coupled to supply voltage $V_1$. Signal conditioner 46 is coupled to resistor 44 through RFI filters 56. Primary conversion circuit 48 is coupled to secondary process control loop 58 through regulator 60 and output stage 62. Loop 58 is in parallel with power supply 64 and sense resistor 66 which provides a voltage output to sense circuitry 68. Regulator 60 provides a regulated voltage level $V_1$ to all circuitry within primary conversion circuit 48. Output stage 62 controls the magnitude of current $I_1$ flowing through loop 58, as is known in the art. In operation, a digital signal is received by signal conditioning circuitry 46 from primary loop 26. MODAC 52 decodes the signal and provides a signal to microprocessor 50. Microprocessor 50 operates in accordance with instructions stored in memory 54 and is described below in more detail. Microprocessor 50 and MODAC 52 control output stage 62 to provide a current $I_1$, typically 4–20 mA in magnitude, in loop 58 representative of a digital process variable signal received from field transmitter 22.

Microprocessor 50 is coupled to additional conversion circuits 80A and 80B which are used to provide analog current representations of additional digitized process variables received from field transmitter 22. For simplicity, numbering has been maintained between circuits 80B, and only the circuitry of circuit 80A will be described in detail.

In circuit 80A, MODAC 82A receives control signals and digital data from microprocessor 50 via opto-isolators 84A and 86A, which electrically isolate the signals. MODAC 82A is coupled to current loop 88A through voltage regulator 90A and output stage 92A. Current loop 88A is coupled to power supply 94A and sense resistor 96A. Sense circuitry 98A is coupled across sense resistor 96A. MODAC 82A outputs an analog signal representative of the received digital signal to output stage 92A, which controls the current $I_A$ flowing through current loop 88A. Current $I_A$ is controlled to represent an additional digitized process variable received from field transmitter 22. Sense circuitry 98A in control room 24 measures current $I_A$ and thus is able to determine the value of the digitized process variable transmitted from field transmitter 22. Regulator 90A generates a regulated voltage level $V_A$ to power circuitry 80A.

Figure 3:
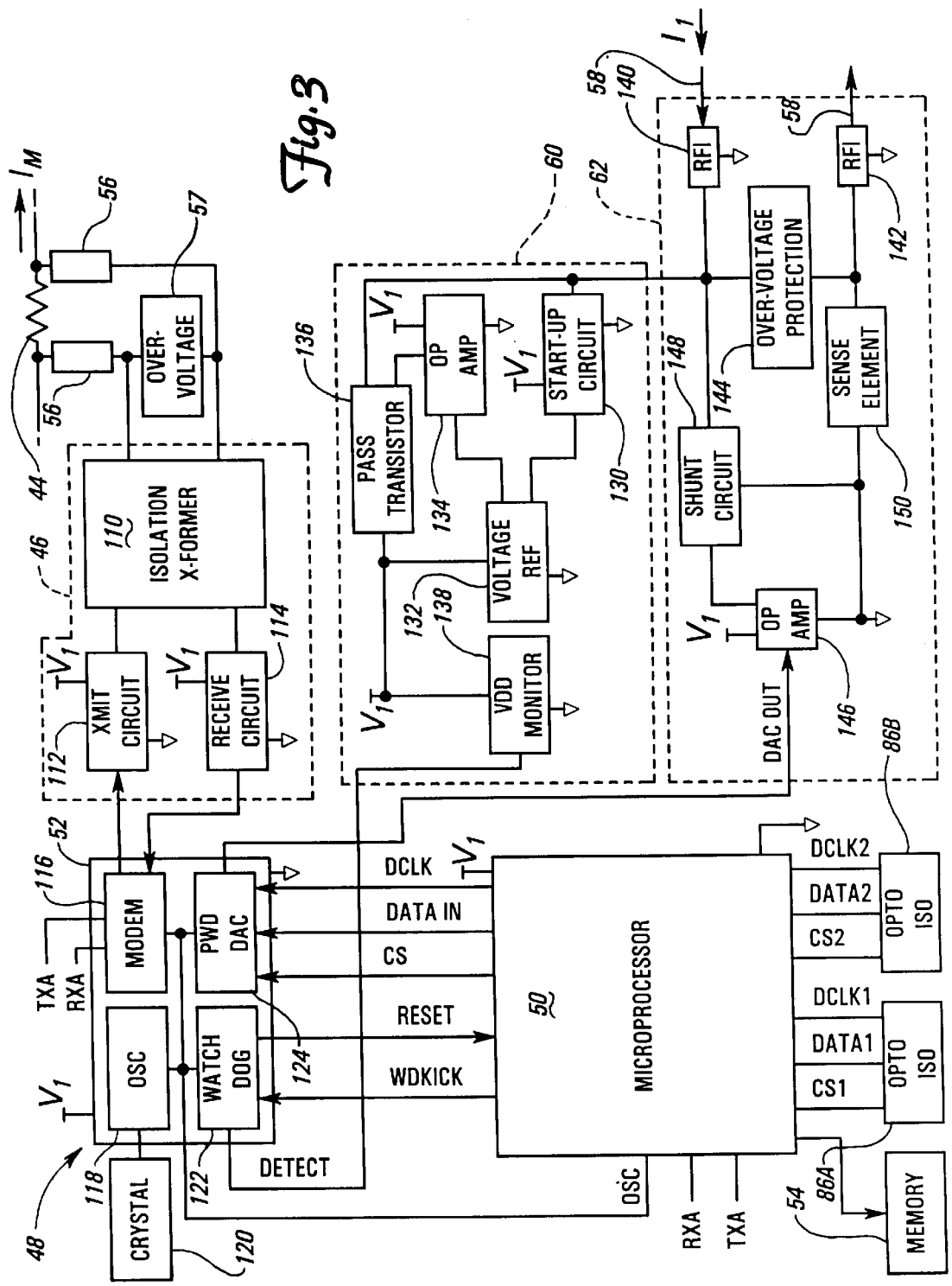
FIG. 3 is a block diagram showing the converter circuitry of FIG. 2.

FIG. 3 is a block diagram showing conversion circuitry 48 in greater detail. Signal conditioning circuit 46 includes an isolation transformer 110 coupled to sense resistor 44 through RFI filters 56. Overvoltage protection circuit 57 provides a voltage shunt if the voltage across resistor 44 exceeds a threshold. Isolation transformer 110 is connected to transmit circuit 112 and receive circuit 114 which are connected to modem 116 in MODAC 52. Modem 116 also has transmit and receive lines (TXA and RXA, respectively) connected to microprocessor 50. MODAC 52 includes oscillator 118 connected to crystal 120 which is used to generate a system clock signal. The system clock signal from oscillator 118 is provided to microprocessor 50, modem 116, watchdog circuit 122 and pulse width modulation digital-to-analog converter (PWM DAC) 124.

Microprocessor 50 provides an input WDKICK to watchdog circuit 122, and watchdog circuit 122 provides a Reset input to microprocessor 50 if the supply voltage drops, if microprocessor 50 locks, or oscillator 118 fails. PWM DAC 124 receives a chip select input CS, DATA IN input and data CLOCK (DCLK) input from microprocessor 50 and provides a pulse width modulated digital output (DACOUT) to output stage 62.

Microprocessor 50 is also shown connected to opto-isolators 86A and 86B. Microprocessor 50 provides chip select (CS1,CS2), data signals (DATA1,DATA2) and data clock signals (DCLK1,DCLK2) to opto-isolators 86A and 86B. Regulator circuit 60 includes start-up circuit 130, voltage reference 132, operational amplifier 134 and VDD monitor 138. Voltage reference 132 generates voltage $V_1$. VDD monitor circuit 138 monitors the supply voltage $V_1$ and provides an input to watchdog circuit 122 if $V_1$ drops below a threshold.

Output stage 62 includes RFI filters 140 and 142. An overvoltage protective circuit 144 is connected across current loop 58 and bypasses current loop 58 upon an overvoltage condition. Opamp 146 is connected to the output of PWM DAC 124 (DACOUT) and controls shunt circuit 148 which adjusts current $I_1$ flowing through loop 58. A resistor 150 provides feedback to opamp 146 and shunt circuit 148.

Figure 4:
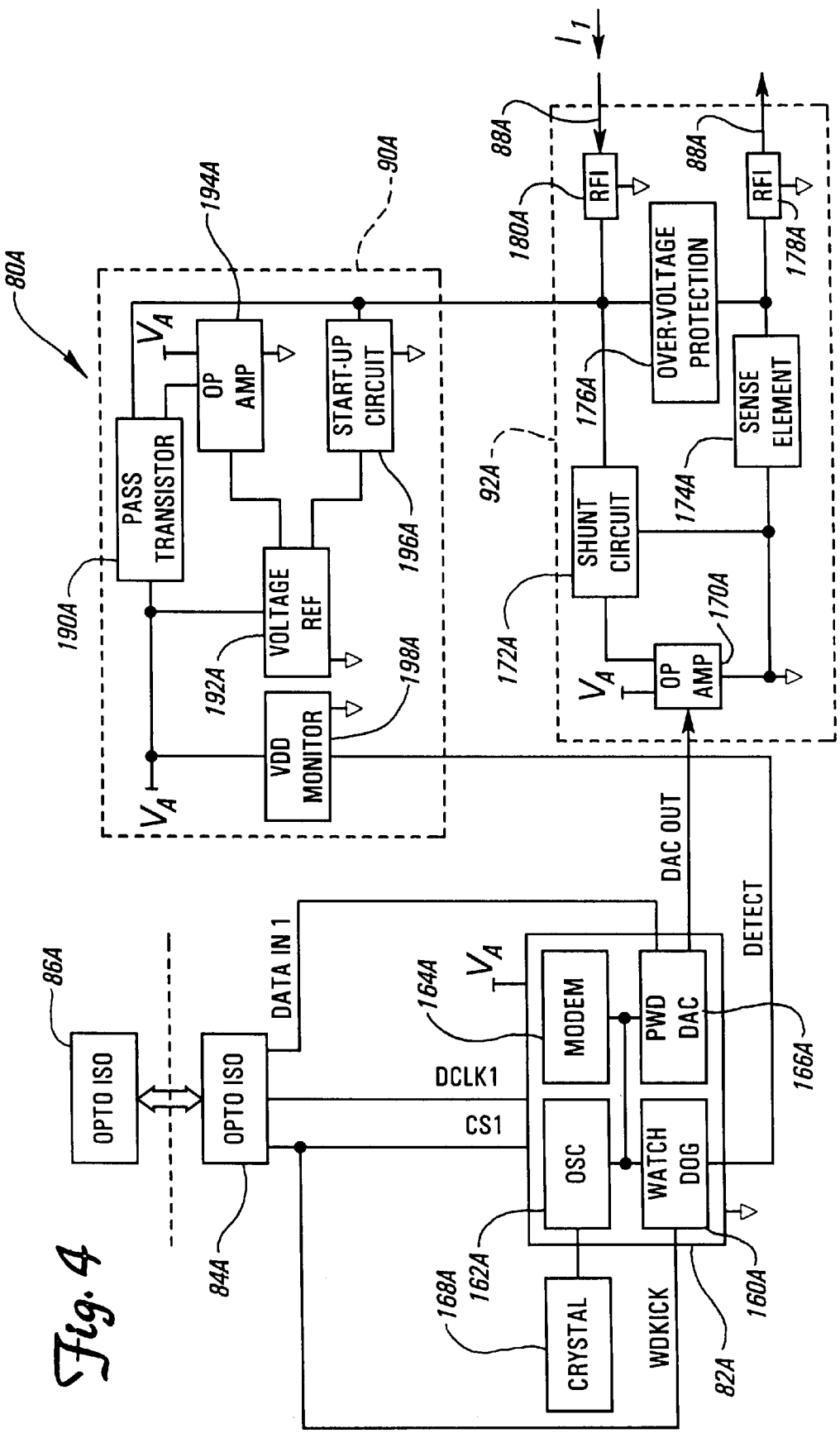
FIG. 4 is a block diagram showing the converter circuitry of FIG. 2.

FIG. 4 is a more detailed block diagram of circuit 80A. Circuit 80A is coupled to circuit 48 through opto-isolators 84A and 86A. The output of opto-isolator 84A includes a chip select (CS1), a data clock (DCLK1) signal and a data in (DATAIN) signal provided to MODAC 82A. Chip select CS1 drives watchdog circuit 160A in MODAC 82A. MODAC 82A includes oscillator 162A, modem 164A and PWM DAC 166A. Oscillator 162A is connected to crystal 168A and provides a clock for circuitry 80A. PWM DAC is controlled by the data signal DCLK1 from opto-isolator 84A and provides a control output (DACOUT) to output stage 92A. Output stage 92A includes opamp 170A, shunt circuit 172A, sense element 174A, overvoltage protection circuit 176A and RFI filters 178A and 180A. Output stage 92A is connected to loop 88A and operates similarly to output stage 62 described above. Regulator 90A includes pass transistor 190A, voltage reference 192A, opamp 194A, startup circuit 196A and VDD monitor 198A. Voltage reference 192A generates voltage $V_A$. Regulator 90A operates in a manner similar to regulator 60 discussed above. Circuits 90B are similar to circuit 90A and will not be discussed in further detail.

In the present invention, converter circuitry 40 provides multiple analog current loop outputs that can be assigned to represent digital process variables sent by field transmitter 22 to the control room. Typically, converter circuitry 40 will reside in process control room 24. Each loop 96A-96B provides power to additional control circuits 80A-80B, respectively. In a preferred embodiment, each loop does not consume more than 3.5 mA of current so that the loop current can be controlled to a minimum of 4.0 mA in a 4–20 mA standard system. The system is calibrated by controlling microprocessor 50 to achieve the desired 4–20 mA range. Calibration data will be stored in memory 54. Microprocessor 50 may be accessed by supplying digital signals over loop 26. Microprocessor 50 monitors each digital process variable sent by field transmitter 22 and adjusts the current on loops 58, 88A and 88B appropriately.

Configuration data is stored in memory 54. This information is used by microprocessor 50 to identify which of the secondary current loops is controlled in response to which of the incoming digital process variables. Furthermore, this configuration information is used to store zero and span information for each of the secondary current loops.

Microprocessor 50 communicates with field transmitter 22 using transmit circuitry 112 and signal condition circuitry 46. Microprocessor 50 is capable of acting as a master controller. For example, microprocessor 50 can poll transmitters connected to loop 26 and detect transmitter responses. An individual transmitter may be polled to obtain its process variable. Additionally, microprocessor 50 is able to obtain diagnostic information from field instruments. Microprocessor 50 can identify the source of an error while continuing to update process variables which are not affected by the error. In one embodiment, the secondary loop control circuitry provides an alarm signal on the secondary loop in response to an alarm condition. Circuitry 40 can be configured to provide contact closure outputs which are used to control other instruments, valves or control systems. In one embodiment, multiple conversion circuits 40 are "daisy chained," or connected serially, together. For example, microprocessor 50 could pass additional digital process variables to a second conversion circuit 40 connected to the primary conversion circuit 40 to provide additional current loop outputs. Further, additional conversion circuits 40 could be connected across the same sense resistor 44 to monitor additional process variables on loop 26.

In another embodiment, conversion circuitry 40 can be placed at a transmitter terminal block (not shown). Further, the circuitry can function with any type of digital communication on a process control loop such as the Field Bus protocol. In another embodiment, conversion circuitry 40 monitors digital process variables sent from multiple field transmitters configured in a multidrop configuration in which multiple transmitters are all connected to the same process control loop.

In one embodiment, conversion circuitry 40 is capable of assuming the status of a master in accordance with the HART® Communication Protocol. In this configuration, conversion circuitry 40 is capable of initiating a HART® request sent to a field instrument on control loop 26. This allows conversion circuit 40 to gather digital process variable data from a field instrument without having placed the field instrument into burst transmission mode. This may be particularly useful in a multi-dropped field instrument loop where a number of field instruments are capable of transmitting digital process variables. Each field instrument can be individually polled to obtain its process variable which are then converted an routed to the appropriate secondary control loop. Furthermore, in accordance with the HART® Communication standard, conversion circuitry 40 can poll transmitters connected to loop 26 and obtain configuration information for each transmitter. This configuration information is used to identify, for example, the type of process variables being sent by each transmitter along with zero and span information for each process variable.

In another aspect of the present invention, two or more digital process variables are received from process control loop 26 by MODAC 52. Microprocessor 50 controls output stage 62 to provide a current $I_1$ in loop 58 which is representative of a function of the first and second digital process variables. For example, if the digital process variables are representative of first and second process pressures, microprocessor 50 can calculate differential pressure, liquid level flow rate, etc. using techniques known in the art and responsively control the current $I_1$. The digital process variables can be received from multiple field transmitters 22 connected on loop 26 or through multiple loops 26 which couple to conversion circuitry 40. This embodiment is particularly advantageous in measuring liquid level in which two separate pressure transmitters couple to a tank containing process fluid and provide digital process variable signals representative of pressure in two different locations of the tank to the conversion circuitry. Using information stored in memory 54 such as the vertical spacing between the two transmitters and the type of process fluid, microprocessor 50 calculates level of liquid in the storage tank. This embodiment can easily be extended such that the current $I_1$ is a function of additional process variables.

Figure 5:
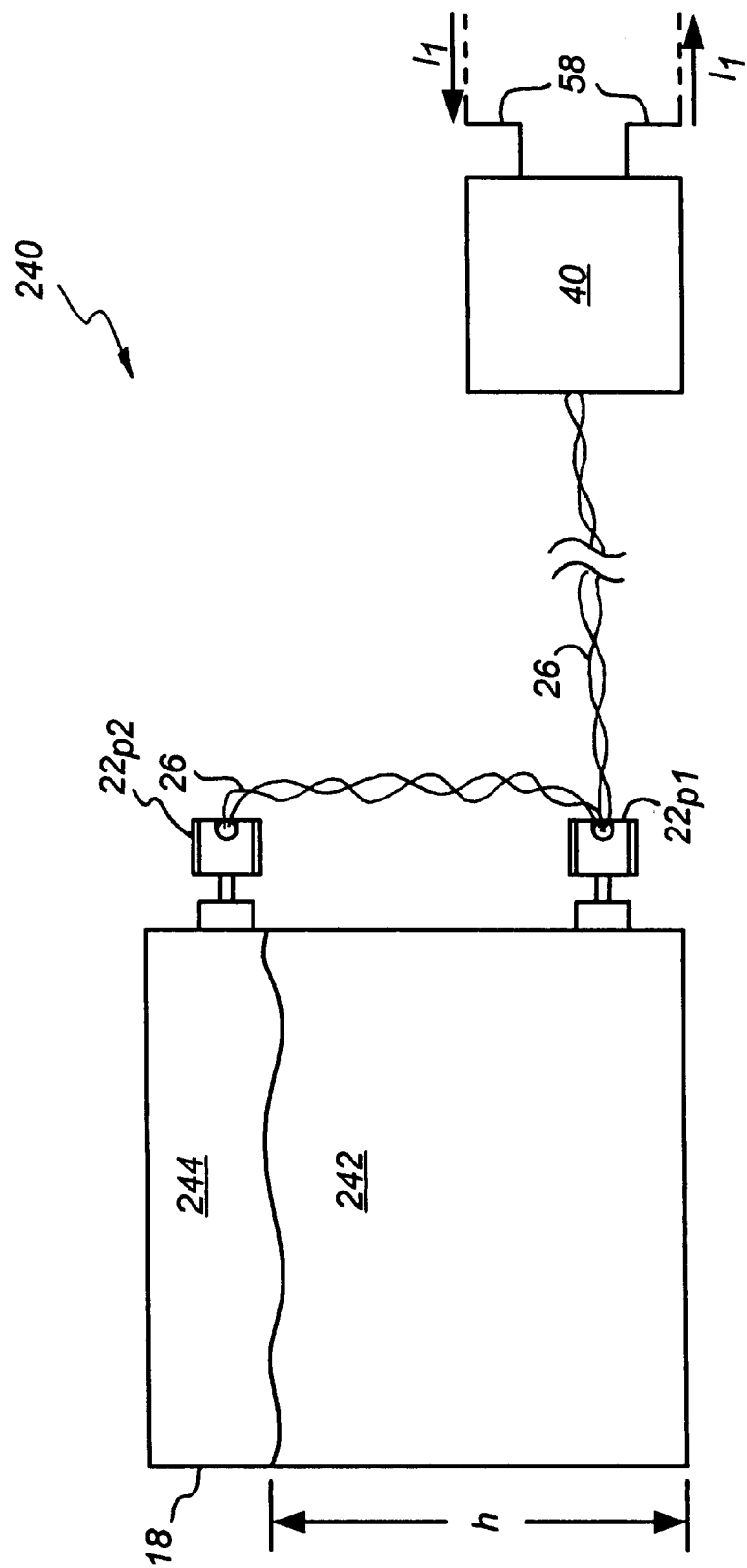
FIGS. 5, 6, and 7 show simplified diagrams for measuring liquid level and flow using the conversion circuitry in accordance with the invention.
Figure 6:
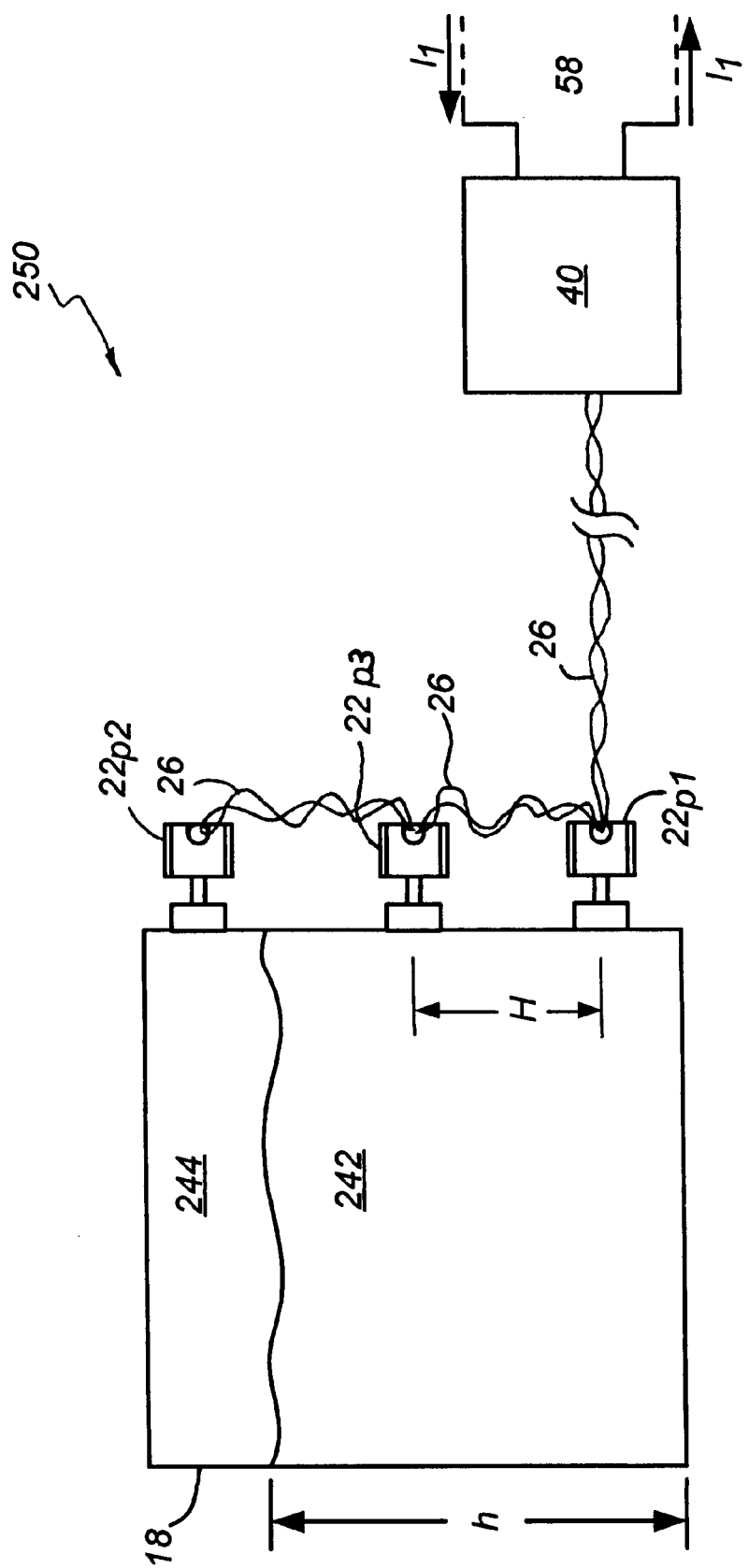
Figure 7:
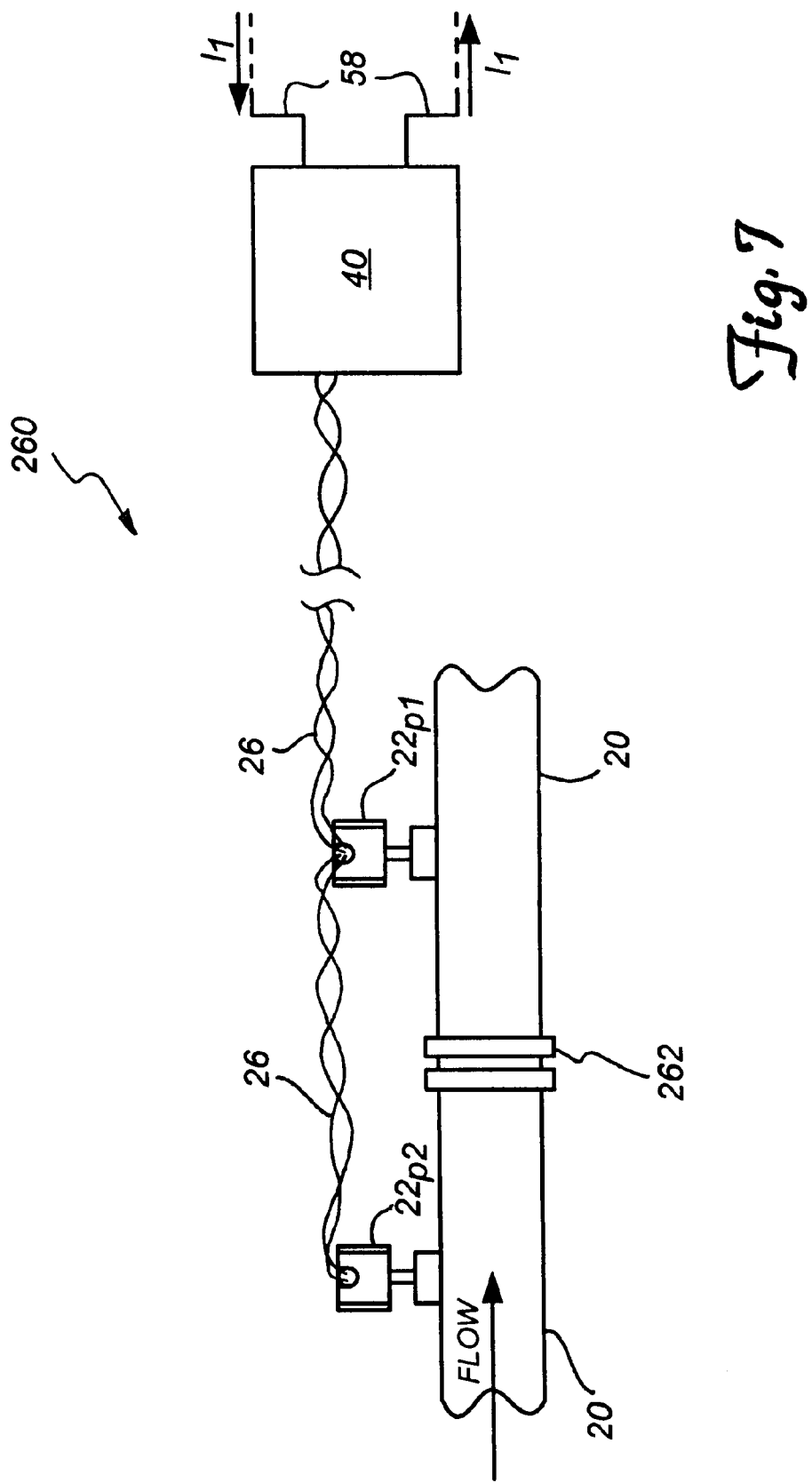

FIG. 5 is a simplified diagram of a liquid level measurement system 240 which illustrates measurement of liquid level (h). Transmitters $22_{P1}$ and $22_{P2}$ are coupled to tank 18 which is filled with process liquid 242 and gas 244. Conversion circuit 40 receives pressures P1 and P2 from transmitters $22_{P1}$ and $22_{P2}$. Differential pressure (dP) is calculated by microprocessor 50 in conversion circuitry 40 as dP=P1−P2. Liquid level is calculated as h=dP/ρg, where ρ is the density of the liquid as supplied by the user and g is a gravity constant. FIG. 6 is a simplified diagram 250 of a liquid level measurement system in accordance with one embodiment in which density of the liquid is unknown. System 250 includes three transmitters $22_{P1}$, $22_{P2}$ and $22_{P3}$ for measuring pressures P1, P2 and P3, respectively. Microprocessor 50 calculates level (h) as h=(P1−P2)(gH)/(P1−P3), where H is the distance between transmitters $22_{P1}$ and $22_{P3}$. Further, FIG. 7 shows a simplified block diagram of a system 260 for measuring flow of a process fluid through conduit 20. In system 260, transmitters $22_{P1}$ and $22_{P2}$ are positioned on opposite sides of an orifice plate 262. Microprocessor 50 calculates flow (Q) as, Q=K(P2−P1)$^{-\frac{1}{2}}$, where K may be a constant or a state equation.

Although the present invention has been described with reference to preferred embodiments, workers skilled in the art will recognize that changes may be made in form and detail without departing from the spirit and scope of the invention. For example, digital process variables may be converted to analog process variables, other than those described above. Furthermore, other analog and digital communication standards can be used.

What is claimed is:

1. Conversion apparatus adapted to couple to a field transmitter through a primary process control loop, comprising:

a digital receiver adapted to couple to the primary process control loop and having a process variable signal input and a digital output related to the process variable signal input;

a controller having a digital signal input coupled to the digital output and having a secondary loop control output related to the process variable signal input; and a secondary loop controller coupled to the secondary loop control output and comprising a current source having an analog current output adapted to couple to a secondary process control loop and being responsive to the secondary loop control output.

2. The apparatus of claim 1 and further comprising a power supply coupled to the secondary loop adapted to receive power from the secondary loop to power the digital receiver, controller and secondary loop controller.

3. The apparatus of claim 1 wherein current in the analog current output is between 4 mA and 20 mA.

4. The apparatus of claim 1 including an opto-isolator optically coupled between the controller and the secondary loop controller and providing isolation between the controller and the secondary loop controller.

5. The apparatus of claim 1 wherein the secondary loop controller is powered by current from the secondary process control loop.

6. The apparatus of claim 1 wherein the process variable signal input from the field transmitter is in accordance with the HART® communication standard.

7. The apparatus of claim 1 wherein the process variable signal input from the field transmitter is in accordance with a Fieldbus communication standard.

8. The apparatus of claim 1 and including a digital transmitter controlled by the controller, coupled to the primary loop, and adapted to responsively transmit a digital signal on the primary loop to the field transmitter.

9. The apparatus of claim 1 wherein the secondary loop controller provides an alarm signal on the secondary loop in response to an alarm condition.

10. The apparatus of claim 1 including a plurality of secondary loop controllers coupled to a plurality of secondary process control loops, wherein the controller provides a plurality of secondary loop control outputs to the plurality of secondary loop controllers to responsively control current through the secondary process control loops.

11. The apparatus of claim 10 wherein the field transmitter provides a digital signal representative of a plurality of process variables and current on each of the plurality of secondary loops is related to one of the plurality of process variables.

12. The apparatus of claim 10 wherein multiple field transmitters are coupled to the primary loop, the multiple field transmitters transmitting digital signals representative of process variables, and wherein current on each of the plurality of secondary loops corresponds to one of the process variables.

13. Conversion circuitry for coupling to a field transmitter over a primary process control loop, comprising:

means for receiving a digital process variable signal from the primary process control loop and providing a digital output related to the digital process variable signal;

means for receiving the digital output and responsively providing a secondary loop control output as a function of the digital process variable signal; and means for controlling current flowing through the secondary loop in response to the secondary loop control output whereby an analog current in the secondary loop is a function of the digital process variable signal provided by the primary process control loop.

14. A method of controlling current in a secondary process control loop, comprising:

receiving a digital process variable signal from a primary process control loop;

providing a digital output related to the digital process variable signal;

providing a secondary loop control output responsive to the digital output; and controlling analog current in the secondary control loop in response to the secondary loop control output as a function of the digital process variable signal.

15. The method of claim 14 and further comprising controlling the current in the secondary control loop between 4 mA and 20 mA.

16. The method of claim 14 and further comprising sending a digital signal on the primary process control loop.

17. The method of claim 14 and further comprising providing an alarm signal based upon an alarm condition on the primary loop.

* * * * *